United States Patent
Argyropoulos et al.

(10) Patent No.: US 8,022,138 B2
(45) Date of Patent: Sep. 20, 2011

(54) POLYURETHANE-UREA POLYMERS DERIVED FROM CYCLOHEXANE DIMETHANOL

(75) Inventors: John N. Argyropoulos, Midland, MI (US); Debkumar Bhattacharjee, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 192 days.

(21) Appl. No.: 12/298,427

(22) PCT Filed: May 17, 2007

(86) PCT No.: PCT/US2007/069143

§ 371 (c)(1),
(2), (4) Date: Oct. 24, 2008

(87) PCT Pub. No.: WO2007/137116

PCT Pub. Date: Nov. 29, 2007

(65) Prior Publication Data

US 2009/0253858 A1 Oct. 8, 2009

Related U.S. Application Data

(60) Provisional application No. 60/801,526, filed on May 18, 2006.

(51) Int. Cl.
*B05D 3/02* (2006.01)
*C08G 18/00* (2006.01)
*C08G 18/08* (2006.01)
*C08G 18/10* (2006.01)
*C08G 18/28* (2006.01)
*C08J 3/00* (2006.01)
*C08K 3/20* (2006.01)
*C08L 75/00* (2006.01)

(52) U.S. Cl. .................. 524/591; 427/372.2; 427/385.5; 427/388.1; 427/393; 524/589; 524/590; 524/839; 524/840; 528/44; 528/59; 528/66; 528/80; 528/83; 528/85

(58) Field of Classification Search .............. 427/372.2, 427/385.5, 388.1, 393; 524/591, 839, 840, 524/589, 590; 528/44, 59, 66, 80, 83, 85
See application file for complete search history.

(56) References Cited

U.S. PATENT DOCUMENTS

| | | | |
|---|---|---|---|
| 2,956,961 | A | 10/1960 | Kibler et al. |
| 3,021,309 | A | 2/1962 | Cox et al. |
| 3,021,317 | A | 2/1962 | Cox et al. |
| 3,169,945 | A | 2/1965 | Hostettler et al. |
| 3,248,417 | A | 4/1966 | Hoffmann et al. |
| 4,237,264 | A | 12/1980 | Noll et al. |
| 4,394,491 | A | 7/1983 | Hoffman |
| 4,408,008 | A | 10/1983 | Markusch |
| 5,539,021 | A | 7/1996 | Pate et al. |
| 5,569,706 | A | 10/1996 | Jacobs et al. |
| 6,252,121 | B1 | 6/2001 | Argyropoulos et al. |
| 2004/0204559 | A1 | 10/2004 | Melchiors et al. |
| 2005/0004367 | A1 | 1/2005 | Du et al. |

FOREIGN PATENT DOCUMENTS

| | | |
|---|---|---|
| GB | 2386898 A | 10/2003 |
| WO | WO-93/24551 | 12/1993 |
| WO | WO-98/41552 | 9/1998 |
| WO | WO-2005023947 | 3/2005 |
| WO | WO-2005/058995 | 6/2005 |
| WO | WO 2006/047431 A1 * | 5/2006 |

OTHER PUBLICATIONS

Argyropoulos J et al: "Unoxol Diol: A New Liquid Cycloaliphatic Diol for Coatings Applications" Paint and Coatings Industry, Western Trade Publ., Canoga Park, CA, US, Jun. 2006, pp. 1-5, XP002432852.

* cited by examiner

*Primary Examiner* — Patrick Niland

(57) ABSTRACT

Aqueous polyurethane dispersion are disclosed where the dispersions contain from 5 to 70 weight percent polyurethane solids wherein the solids are obtained from at least one isocyanate terminated prepolymer prepared by reacting (a) a polyol or polyol blend having a mean average equivalent weight of 200 to 2,000; and (b) at least one polyisocyanate where the prepolymer is dispersed in water; optionally in the presence of (c) one or more stabilizers; or (d) one or more amine chain extenders or both; wherein the prepolymers have an isocyanate (NCO) content of from 2 to 40 weight percent and the polyol or polyol blend (a) contains at least 15 weight percent of a polyester based on a polycarboxylic acid or lactone component and a glycol component, wherein the glycol component contains isomers of 1,3- and 1,4-cyclohexanedimethanol (1,3-/1,4-CHDM) where the ratio of the 1,3-/1,4-isomers is from 35:65 to 65:35.

15 Claims, 1 Drawing Sheet

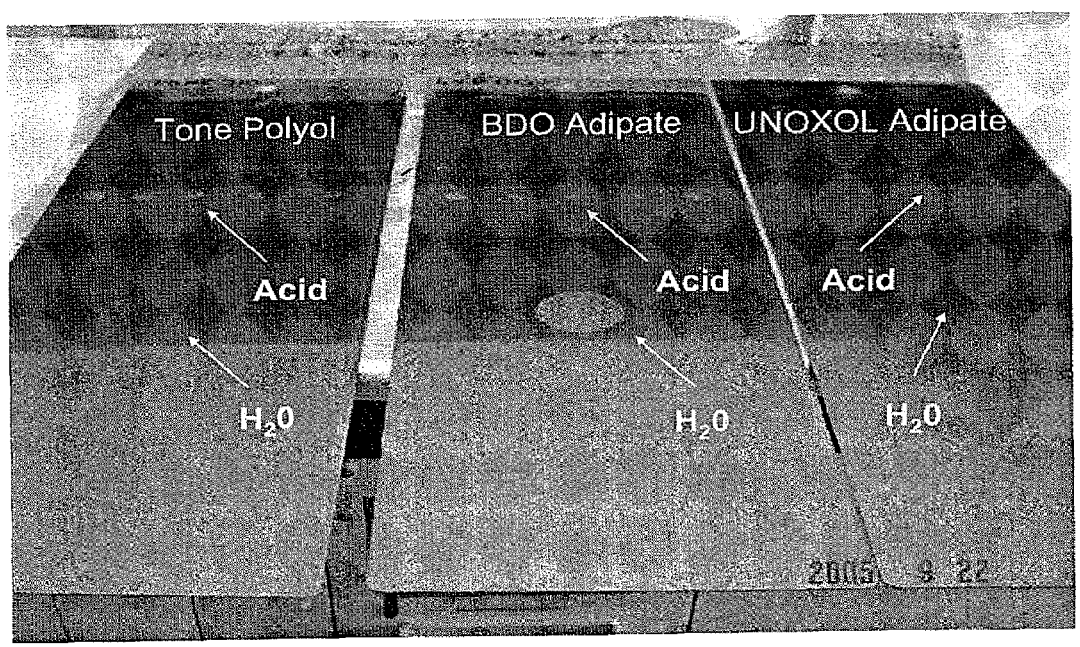
Figure 1. Acid and Hydrolytic Resistance of PUD Coatings

POLYURETHANE-UREA POLYMERS DERIVED FROM CYCLOHEXANE DIMETHANOL This invention relates to polyurethane dispersions (PUDs) and polymers produced therefrom where the polymers have enhanced hydrolytic and acid etch resistance.

Polyurethane dispersions (PUDs) are used in a variety of applications ranging from medical instruments, construction, adhesives, coatings of various substrates such as textiles, metal, wood, glass, plastics, etc. Concerns about emissions of volatile organic compounds (VOCs) along with stricter legislation on VOCs have led to an increased focus on the use of water based systems for numerous applications. The production of polyurethane-urea dispersions is known, as exemplified in U.S. Pat. Nos. 4,237,264; 4,408,008; 5,569,706; U.S. Patent Publications 2004204559; 2005004367; GB Patent Publication 2386898 and WO Publication 2005023947.

For coating applications, polyester resins are widely used to formulate low VOC coatings. Such polyesters are typically diols which are a condensation reaction of isophthalic acid and/or adipic acid with a diol. Diols used in the preparation of polyesters, such as ethylene glycol, 2,2-dimethyl-1,3-propandiol (neopentyl glycol), 1,4-cyclohexanedimethanol, 1,4-butane diol, etc. Coatings prepared from 1,4-cyclohexanedimethanol (1,4-CHDM) offer better salt spray, humidity and detergent resistance as compared to polyols based on other diols. A disadvantage of polyester resins prepared from 1,4-CHDM is their high viscosity, lower solvent solubility and a tendency to crystallize.

It is the object of the present invention is provide PUDs containing a polyester which gives polymers with outstanding hydrolytic resistance and acid resistance compared to similar polymers derived from typical polyester polyols.

The present invention is an aqueous polyurethane dispersion containing from 5 to 70 weight percent polyurethane solids wherein the solids are obtained from at least one isocyanate terminated prepolymer prepared by reacting
  (a) a polyol or polyol blend having a mean average equivalent weight of 200 to 2,000; and
  (b) at least one polyisocyanate
where the prepolymer is dispersed in water; optionally in the presence of
  (c) one or more stabilizers; or
  (d) one or more amine chain extenders or both;
wherein the prepolymers have an isocyanate (NCO) content of from 2 to 40 weight percent and the polyol or polyol blend (a) contains at least 15 weight percent of a polyester based on a polycarboxylic acid or lactone component and a glycol component, wherein the glycol component contains isomers of 1,3- and 1,4-cyclohexanedimethanol (1,3-/1,4-CHDM) where the ratio of the 1,3-/1,4-isomers is from 35:65 to 65:35.

In another embodiment, the invention is to polyurethane polymers obtained from such dispersions.

In another embodiment the invention is to coatings, elastomers and adhesives prepared from such dispersion.

FIG. 1 shows the acid and hydrolytic resistance of PUD coatings on metal panels.

It has been found that dispersions containing polyester polyols derived from a mixture of 1,3-/1,4-cyclohexanedimethanol (1,3-/1,4-CHDM) produce a polyurethane polymer having good hydrolytic and acid resistance. Examples of such polymers have utility in elastomeric and hard coatings, adhesives and sealants. While dispersion containing polyesters based on 1,3-/1,4-CHDM are particularly suited in the above noted applications, the dispersions also have applicability for use in the production of thermoplastic polyurethanes (TPUs), especially where it is desired to have polyester based systems with increased hydrolysis and acid resistance.

The polyurethane prepolymers in making the PUDs include a polyisocyanate component and an isocyanate reactive component also known as an active hydrogen containing material or polyol. The term polyurethane includes polymers containing linkages known to those in the art associated with the formation of a polyurethane, such as urea or polyureas, allophonate, biuret, etc.

These advantages are observed where polyesters based on 1,3-/1,4-CHDM comprise at least 15 weight percent of the polyol component. Generally the polyesters polyols based on 1,3-/1,4-CHDM comprise at least 30, preferably at least 45 and more preferably 50 weight percent of the polyol component. The polyesters based on 1,3-/1,4-CHDM can comprise up to 80, up to 85, up to 90 or even up to 95 weight percent of the polyol component. In one embodiment, the polyesters based on 1,3-/1,4-CHDM is 100 weight percent of the polyol component.

The polyesters are produced by the reaction of one or more polycarboxylic acid or lactone with a glycol component, for example, 1,3-/1,4-CHDM or with 1,3-/1,4-CHDM and additional polyhydroxy compound(s). The polyesters may be a mixture of polyesters based on a polycarboxylic acid and lactone. The ratio of the 1,3- to 1,4-isomer for use in the present invention is generally from 35:65 to 65:35. Preferably the 1,3- to 1,4-isomer ratio is from 40:60 to 60:40. More preferably the 1,3- to 1,4-isomer ratio is from 45:55 to 55:45. Generally the stereoisomers will be in the range from 13-15 percent of cis 1,4; 29-32 percent of trans 1,4; 26-29 percent cis 1,3; and 25-31 percent of trans 1,3 based on the total weight of the 1,3- and 1,4-isomers Suitable polycarboxylic acids can have two or more carboxylic acid groups or an equivalent number of anhydride groups on the basis that one anhydride group is equivalent to two acid groups. Such polycarboxylic acids are well known in the art. Preferably the polycarboxylic acid contains two carboxylic acid groups.

Examples of suitable polycarboxylic acids include aliphatic dicarboxylic acids having 2 to 12, preferably 2 to 8 carbon atoms in the alkylene chain. These acids include, for example, aliphatic dicarboxylic acids such as adipic acid, glutaric acid, pimelic acid, suberic acid, azelaic acid, sebacic acid, undecanedoic acid, dodecanadioic acid, succinic or hexanedioic acid; cycloaliphatic acids such as hexahydrophthalic acid and 1,3- and 1,4-cyclohexane dicarboxylic acid; 1,3- and 1,4-unsaturated alkane dioic acids such as fumaric or maleic acids; dimer acids; and aromatic acids such as phthalic acid and terephthalic. The anhydrides of the aforementioned polybasic acids such as maleic anhydride or phthalic anhydride can also be used. A combination of two or more of the polybasic acids may also be used. In one embodiment, it is preferred to use succinic acid, adipic acid or a combination thereof.

Illustrative examples of lactone which may be reacted with the glycol component include δ-valerolactone, ϵ-caprolactone, ϵ-methyl-ϵ-caprolactone, and ξ-enantholactone. A preferred lactone is caprolactone.

Additional polyhydroxy compounds which may be present in addition to the 1,3-/1,4-CHDM include dihydric to octohydric alcohols. Examples of di- and multifunctional alcohols are ethylene glycol, diethylene glycol, propylene glycol, dipropylene glycol, 1,3-propanediol, 1,10-decanediol, glycerine, trimethylolpropane, 1,4-butanediol, and 1,6-hexanediol. If trifunctional or higher alcohols are used, their amount is generally chosen in such that the nominal functionality of a blend is a maximum of 3.5, preferably from 2 to 3.0.

In one embodiment, ethylene glycol, diethylene glycol, butanediol, or a combination is used as an additional glycol component.

Processes for the production of 1,3- and 1,4-cyclohexanedimethanol isomers and conversion to polyesters are known in the art. In one embodiment, the structural and configuration isomers of cyclohexanedimethanol are produced via the process disclosed in U.S. Pat. No. 6,252,121, the disclosure of which is incorporated herein by reference. In general the cyclohexanedicarboxaldehyde is hydrogenated in the presence of a metal-organophosphorus ligand complex catalyst to produce the corresponding cyclic alcohol. The alcohol is then reacted with a polybasic acid to form a polyester.

Processes for the production of polyester polyols are well known in the art. To prepare the polyester polyols, the organic poycarboxylic acids or lactone are polycondensed with the polyhydric alcohol(s). To remove volatile byproducts, the polyester polyols can be subjected to distillation under reduced pressure, stripping with an inert gas, vacuum, etc.

The polyol component for producing a prepolymer, in addition to containing polyester based on 1,3-/1,4-CHDM, may contain one or more additional polyols such as polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491. Alternative polyols that may be used include polyalkylene carbonate-based polyols and polyphosphate-based polyols.

Suitable polyether polyols include those having a nominal functionality of from 2 to 8, preferably 2 to 6. Typically such polyether polyols may be obtained by reaction of an active hydrogen-containing initiator with a quantity of one or more alkylene oxides to give a product of desired hydroxyl nature and equivalent weight. Generally such alkylene oxides are C2 to C4 alkylene oxides and include butylenes oxide, ethylene oxide and propylene oxide or a mixture thereof. Exemplary initiators for polyether polyols include, for example, ethanediol, 1,2- and 1,3-propanediol, diethylene glycol, dipropylene glycol, tripropyleneglycol; polyethyleneglycol, polypropylene glycol; 1,4-butanediol, 1,6-hexanediol, glycerol, pentaerythritol, sorbitol, sucrose, neopentylglycol; 1,2-propylene glycol; trimethylolpropane glycerol; 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0$^{2,6}$] decene; Dimerol alcohol (36 carbon diol available from Henkel Corporation); hydrogenated bisphenol; 9,9(10,10)-bishydroxymethyloctadecanol; 1,2,6-hexanetriol; and combination thereof. Catalysis for production of polyether polyols can be either anionic or cationic, with catalysts such as KOH, CsOH, boron trifluoride, a double metal cyanide complex (DMC) catalyst such as zinc hexacyanocobaltate or quaternary phosphazenium compound.

Other initiators for polyether polyols include linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-Methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

Polylactone polyols may also be used and are generally di- or tri- or tetra-hydroxyl in nature. Such polyol are prepared by the reaction of a lactone monomer; illustrative of which is δ-valerolactone, ε-caprolactone, ε-methyl-ε-caprolactone, ξ-enantholactone, and the like; with an initiator that has active hydrogen-containing groups; illustrative of which is ethylene glycol, diethylene glycol, propanediols, 1,4-butanediol, 1,6-hexanediol, trimethylolpropane, and the like. The production of such polyols is known in the art, see, for example, U.S. Pat. Nos. 3,169,945, 3,248,417, 3,021,309 to 3,021,317. The preferred lactone polyols are the di-, tri-, and tetra-hydroxyl functional ε-caprolactone polyols known as polycaprolactone polyols.

Suitable polyester polyols are as those described above. The 1,3-/1,4-CHDM based polyester polyol, or other polyol used in making the prepolymer generally has an hydroxyl equivalent weight from 200 to 2000, preferably from 300 to 1500, more preferably from 400 to 1,300 and even more preferably from 400 to 1000. For the present dispersions it is preferred to have at least 50 weight percent polyester polyol in the polyol component.

The polyisocyanate component of the prepolymer formulations of the present invention can be advantageously selected from organic polyisocyanates, modified polyisocyanates, and mixtures thereof, and include aliphatic, aromatic and cycloaliphatic isocyanates. Aromatic polyisocyanates include, for example, 2,4- and 2,6-toluenediisocyanate (TDI) and the corresponding isomeric mixtures; 4,4'-, 2,4'- and 2,2'-diphenyl-methanediiso mixtures; polyphenyl polymethylene polyisocyanates (PMDI); and mixtures cyanate (MDI) and the corresponding isomeric of the forgoing. Examples of aliphatic and cycloaliphatic isocyanate compounds include 1,6-hexamethylene-diisocyanate (HDI); isophorone diisocyanate (IPDI); 1,4-tetramethylene diisocyanate; 2,4- and 2,6-hexahydrotoluene-diisocyanate, the isomeric mixtures thereof; 4,4'-, 2,2'- and 2,4'-dicyclohexylmethanediisocyanate ($H_{12}$MDI), the isomeric mixtures thereof; 1,3-tetramethylene xylene diisocyanate; norbane diisocyanate; and 1,3- and 1,4-bis(isocyanatomethyl)cyclohexane can also be used with the present invention. Mixtures of the aromatic, aliphatic and cycloaliphatic isocyanates may also be used.

The polyisocyanate component of the formulations of the present invention can also include so-called modified multifunctional isocyanates, that is, products which are obtained through chemical reactions of the above diisocyanates and/or polyisocyanates. Exemplary are polyisocyanates containing esters, ureas, biurets, allophanates, carbodiimides and/or uretonimines; isocyanurate and/or urethane group containing diisocyanates or polyisocyanates.

The prepolymers of the present invention can be prepared in any way known to those of ordinary skill in the art of preparing polyurethane prepolymers. Preferably the polyisocyanate and polyol component are brought together and heated under reaction conditions sufficient to prepare a polyurethane prepolymer. The stoichiometry of the prepolymer formulations of the present invention is such that the polyisocyanate is present in excess.

A monol can be included in the prepolymer formulation, the monol is preferably a mono-functional hydrophilic polyether. The monols can be incorporated into the prepolymer as a means of modifying the properties of the latex and improving ease of emulsion formation. When present, the monol is present in amount of from 0.1 to 15 weight percent of the prepolymer formulation, preferably from 2 to 5 weight percent of the prepolymer formulation.

The prepolymer can be made in the presence of a solvent and the solvent can be removed before or after the production of the dispersion. If a solvent is present, the solvent is generally removed after formation of the dispersion to give an aqueous dispersion which is essentially free of solvent. That is, the dispersion contains less than 5 percent, preferable less than 2.5 percent and more preferably less than 1 percent by weight of solvent. When a solvent is used, examples of solvents which are not reactive with the isocyanate include ketones, such as acetone and butanone; ethers such as tetrahydrofuran, dioxane and dimethoxyethane, ether esters, such as methoxypropyl acetate; (cyclic) aminde and ureas, such as dimethylformamide, dimethylacetamide, N,N'-dimethyl-2,5-dizapentanone; N-methylpyrrolidone; and capped glycol ethers, such as PROGLYDE™ DMM (trademark of The Dow Chemical Company). These solvents may be added at any stage of the prepolymer preparation.

The total amount of the solvent used for the synthesis is in the range of 0 to 25 percent by weight of the polymer, preferably in the range of 3 to 15 percent, more preferably in the range of 5 to 12 percent. The amount of organic solvent used in the isocyanate-terminated prepolymer synthesis depends on the reactant concentration and the reaction temperature.

Processes for making dispersions are well known in the art. The dispersions can be done by a batch process or by a continuous process. If done by a batch process, preferably, the dispersion in done by an inverse phase process wherein a small amount of water, including a small amount of anionic surfactant, is first added to a continuous prepolymer phase and mixed and then more water is added with mixing until the phase inverts.

When dispersions are prepared by means of a continuous process, preferably they are prepared by means of a high internal phase ratio (HIPR) process. Such processes are known and are disclosed in, for Example, U.S. Pat. No. 5,539,021 to Pate, et al., and WO 98/41552 A1 to Jakubowski, et al. When prepared by either method, the resulting dispersion should have a particle size sufficient to make the dispersion stable. The dispersions of the present invention will have a particle size of from 0.9 to 0.05, preferably from 0.5 to 0.07 and even more preferably, from 0.4 to 0.10 microns.

Surfactants can be useful for preparing a stable dispersion of the present invention, and/or for preparing a stable froth. Surfactants useful for preparing a stable dispersion in the practice of the present invention can be cationic surfactants, anionic surfactants, zwitterionic or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants, such as ethoxylated alcohol, ethoxylated fatty acid, sorbitan derivative, lanolin derivative, ethoxylated nonyl phenol or a alkoxylated polysiloxane. Furthermore, the surfactants can be either external surfactants or internal surfactants. External surfactants are surfactants which do not become chemically reacted into the polymer during dispersion preparation. Examples of external surfactants useful herein include salts of dodecyl benzene sulfonic acid, and lauryl sulfonic acid salt. Internal surfactants are surfactants which do become chemically reacted into the polymer during dispersion preparation. An example of an internal surfactant useful herein includes 2,2-dimethylolpropionic acid (DMPA) and its salts. A surfactant can be included in a formulation of the present invention in an amount ranging from 0.01 to 8 parts per 100 parts by weight of polyurethane component.

It is preferred the prepolymers are extended with a chain extender. Any chain extender known to be useful to those of ordinary skill in the art of preparing polyurethanes can be used with the present invention. Such chain extenders typically have a molecular weight of 30 to 500 and have at least two active hydrogen containing groups. Polyamines are a preferred class of chain extenders. Other materials, such as water, can function to extend chain length and so are chain extenders for purposes of the present invention. It is particularly preferred that the chain extender is an amine or a mixture of water and an amine such as, for example, aminated polypropylene glycols such as Jeffamine D-400 and others from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender is often used as solution of chain extender in water. The chain extension with water, amine or both, gives a polyurethane-polyurea polymer.

Generally an amine chain extender is used at an amount such that the equivalents of active hydrogens of the chain extender is less than the equivalents of NCO to avoid an excess of free amine in the dispersion. Generally the amine is added to provide approximately 95 percent of equivalents represented by the prepolymer NCO content.

The dispersions will generally have a solids content of from 5 to 70 weight percent, preferably from 30 to 60. While the dispersion themselves will be stored and shipped at a high solids content as possible to minimize storage volume and shipping costs, the dispersion can be diluted prior to final use.

The aqueous dispersions of the invention may be advantageously employed as coating compositions, for which purpose they may be further diluted with water and/or organic solvent, or they may be supplied in more concentrated form by evaporation of water and/or organic components of the liquid medium. As coating compositions, they may be applied to any substrate including wood, metals, woven and non-woven textiles, leather, paper, ceramics, stone, concrete, bitumen, hard fibers, straw, glass, porcelain, plastics of a variety of different types, glass fibers, and plastics. The dispersion may be applied by any conventional method including brushing, dipping, flow coating, roller coating, spraying etc.

The dispersions may also be used as adhesives for materials such a polypropylene, polyester, polyurethane, leather, etc, or as a binding agent for various particulate materials, such as rubber particles.

The dispersions may also be frothed to produce a foam when applied to a substrate.

The composition may contain other conventional ingredients including organic solvents, pigments, dyes, emulsifiers, surfactants, rheology modifiers, defoamers, leveling agents, matting agents, heat stabilizers, leveling agents, anti-crating agents, fillers, sedimentations inhibitors, UV absorbers, antioxidants introduced at any stage of the production process or subsequently. It is possible to include an amount of antimony oxide in the dispersions to enhance the fire retardant properties.

The PUDs are preferably applied at ambient temperatures as described above. Drying of the products obtained by the various applications of the PUDs can be carried out at room temperature or at elevated temperature.

The following examples are provided to illustrate the present invention. The examples are not intended to limit the scope of the present invention and should not be so interpreted. All percentages are by weight unless otherwise noted. Polyol 1 is a polyester polyol having an hydroxyl equivalent weight of 813 derived from the reaction of adipic acid and 1,3-/1,4-cyclohexanedimethanol having a 1,3-/1,4-isomer ratio of approximately 58:42. In FIG. 1, this is labeled UNOXOL adipate.

A series of PUDs are prepared to compare the performance properties of a polyol based on 1,3-/1,4-CHDM to polyols commonly used as raw materials for PUDs. The PUDs are prepared by a batch process using N-methyl pyrollidone (NMP) as a solvent, isophorone diisocyanate (IPDI) as the diisocyanate and are anionically stabilized with 2,2-dimethylolpropionic acid (DMPA). The recipe for the PUDs is given in Table 1 and a detailed description is provided in Example 1.

TABLE 1

Recipe for Poloyurethane Dispersions

| | |
|---|---|
| NCO/OH Ratio | 1.70 |
| DMPA/Polyol Ratio | 0.62 |
| Carboxyl/Amine[1] Ratio | 1.18 |
| Free NCO/Amine[2] Ratio | 1.10 |

[1]Amine was triethylamine.
[2]Amine was ethylene diamine.

EXAMPLE 1

Preparation of Prepolymer and Dispersion 154 grams of Polyol 1, 8.2 grams of dimethylolpropionic acid, 49 grams of NMP, and 0.088 grams of dibutyl tin dilaurate catalyst are added to a 500 milliliter five-neck round bottom glass flask equipped with a mechanical stirrer, condenser, addition funnel, nitrogen inlet, and a Therm-O-Watch sensor to monitor/control reaction temperature. The mixture is brought up to 80° C. with stirring using an external hot oil bath. Nitrogen is sparged through the solution for two hours until the concentration of water is measured to be below 200 ppm. The reactor contents are then cooled to 75° C. and 58.82 grams of isophorone diisocyanate (IPDI) are slowly added to the reaction mixture to maintain the reaction temperature at 75° C. After all the IPDI is added, the reaction temperature is increased to 83° C. (+/−3° C.) and maintained at that temperature for 3 hours. 4.7 grams of triethylamine is added to the reaction mixture and the temperature is maintained for an additional 20 minutes. The reactor contents are then cooled to 60° C. and a total of 167 grams of the reaction mixture are added to an 8 ounce glass bottle containing 112 grams of deionized water under high speed agitation. 5.1 grams of ethylene diamine in 55 grams of deionized water are then added to the aqueous dispersion and the high speed agitation was maintained for an additional 20 minutes, leading to a stable aqueous polyurethane dispersion.

EXAMPLE 2

Preparation of Coatings

The PUD is then drawn down on polished cold rolled steel panels (which were cleaned with acetone and dried in an oven) using a #60 wire wound rod to achieve a target dry film thickness between 1.5 to 2.0 mils. The wet coating films are allowed to dry at room temperate for 30 minutes and then forced dried in an oven at 80° C. for 120 minutes. The oven-cured coatings are allowed to stand for 24 hours before their physical properties were measured.

COMPARATIVE EXAMPLES A, B AND C

The formulations for Examples A-C are given in Table 2. These PUDs and coatings prepared therefrom are done as per examples 1 and 2.

The coating properties of the PU dispersions as a function of the polyol are shown in Table 2. In all cases, the toughness (balance of hardness and flexibility) and abrasion resistance of the coatings were excellent, which are characteristic properties of PUDs. The PUDs prepared from the 1,3-/1,4-CHDM based polyol resulted in a coating with the best hydrolytic and acid etch resistance as shown in FIG. 1.

TABLE 2

Properties of PUD Coatings

| | Example 2 | Comparative Example A | Comparative Example B | Comparative Example C |
|---|---|---|---|---|
| Polyol | Polyol 1 | BDO Adipate[2] | Tone 210[3] | Tone 240[4] |
| Pencil Hardness | 2H | 2H | 2H | 2H |
| Impact Resistance | | | | |
| Direct (in.-lb.) | 200 | 200 | 200 | 200 |
| Indirect (in.-lb.) | 200 | 200 | 200 | 200 |
| Taber Abrasion[5] (mg loss) | 4.8 | 4.3 | 5.7 | — |
| Hydrolytic Resistance[6] | No Blushing | Severe Blushing | Moderate Blushing | Moderate Blushing |
| Acid Etch Resistance[7] | No Etch | Severe Etch | Severe Etch | Severe Etch |

[2]A diol (EW = 374) from the reaction of 1,4-butanediol with adipic acid.
[3]A caprolactone based diol with an equivalent weight (EW) of 415.
[4]A caprolactone based diol with an equivalent weight (EW) of 1000.
[5]CS-17 wheels, 1000 g weights, 500 cycles.
[6]Deionized water covered for 24 hours at room temperature.
[7]10 percent $H_2SO_4$ for 5 hours at room temperature.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An aqueous polyurethane dispersion containing from 5 to 70 weight percent polyurethane solids wherein the solids are obtained from at least one isocyanate terminated prepolymer prepared by reacting
    (a) a polyol or polyol blend having a mean average equivalent weight of 200 to 2,000; and
    (b) at least one polyisocyanate where the prepolymer is dispersed in water; optionally in the presence of
    (c) 0.01 to 8 parts by weight of the polyurethane of one or more surfactants; and
    (d) one or more amine chain extenders;
wherein the prepolymers have an isocyanate content of from 2 to 40 weight percent and the polyol or polyol blend (a) contains at least 15 weight percent of a polyester based on a C2 to C12 polycarboxylic acid and a glycol component, wherein the glycol component contains isomers of 1,3- and 1,4-cyclohexanedimethanol where the ratio of the 1,3-/1,4-isomers is from 35:65 to 65:35.

2. The dispersion of claim 1 wherein the solids content is from 40 to 60 weight percent.

3. The dispersion of claims 1 wherein the polyisocyanate is an aliphatic isocyanate.

4. The dispersion of claim 3 wherein the isocyanate is 1,6-hexamethylene-diisocyanate; isophorone diisocyanate, 1,3-, 1,4-bis(isocyanatomethyl)cyclohexane or a mixture thereof.

5. The dispersion of claim 1 wherein the polyisocyanate is an aromatic isocyanate.

6. The dispersion of claim 5 wherein the isocyanate is 2,4- or 2,-6 -toluenediisocyanate, 4,4', 2,4' or 2,2'-diphenylmethanediisocyanate or a mixture of such isomers, polyphenyl polymethylene polyisocyanate or a mixture thereof.

7. The dispersion of claim 6 wherein the isocyanate is diphenylmethanediisocyanate.

8. The dispersion of claim 1 wherein the prepolymer and dispersion are prepared in the absence of an organic solvent.

9. The dispersion of any one of the preceding claims wherein the polyol or polyol blend has an average mean equivalent weight of 300 to 1500.

10. This dispersion of claim 9 wherein the polyol or polyol blend has an average mean equivalent weight of 400 to 1200.

11. The dispersion of claim 1 wherein the polyester based on 1,3,-/1,4-cyclohexanedimethanol comprises at least 50 weight percent of the total polyol component.

12. The dispersion of claim 1 wherein the prepolymer is made in the presence of a solvent and the solvent is substantially removed prior to dispersion of the prepolymer in water.

13. The dispersion of any of the preceding claims wherein the dispersion is made in a continuous process.

14. A polyurethane polymer derived from the dispersion of claim 1.

15. The polymer of claim 14 wherein the polyurethane polymer is a coating, adhesive, sealant, elastomer or foam.

* * * * *